United States Patent

[11] 3,536,152

| [72] | Inventor | Olle Bostroem |
| | | Taby, Sweden |
| [21] | Appl. No. | 752,029 |
| [22] | Filed | Aug. 12, 1968 |
| [45] | Patented | Oct. 27, 1970 |
| [73] | Assignee | AGA Aktiebolag |
| | | a corporation of the Kingdom of Sweden |
| [32] | Priority | Aug. 17, 1967 |
| [33] | | Sweden |
| [31] | | 11554/67 |

[54] WEIGHING DEVICE FOR AUTOMATICALLY WEIGHING A LOAD COMPRISING A PLURALITY OF SUBSTANCES AND METHOD OF FILLING CONTAINERS WITH THE AID OF THE WEIGHING DEVICE
7 Claims, 2 Drawing Figs.

[52] U.S. Cl. .................................................... 177/1,
 177/70, 177/213
[51] Int. Cl. ...................................................... G01g 19/22,
 G01g 7/00
[50] Field of Search .................................................... 177/70,
 213, 214, 235, 236, 1

[56] References Cited
UNITED STATES PATENTS

| 2,659,563 | 11/1953 | Saxe | 177/70 |
| 3,117,640 | 1/1964 | MacKinney | 177/70 X |
| 3,123,164 | 3/1964 | Echenique et al. | 177/214X |
| 3,127,947 | 4/1964 | Vogel | 177/70 |

FOREIGN PATENTS

| 90,085 | 9/1958 | Netherlands | 177/214 |
| 849,314 | 9/1960 | Great Britain | 177/70 |

*Primary Examiner*—Stephen J. Tomsky
*Assistant Examiner*—George H. Miller, Jr.
*Attorney*—Larson and Taylor

ABSTRACT: An automatic weighing apparatus for substances sequentially added to a container includes a balance arm and a weight displaceable along the arm. The quantities of the substances to be added are preset by presetting the angular positions of a number of suitably scaled wheels. Rotation of these wheels to their preset positions causes displacement of the weight along the balance arm as well as the storage of energy in a plummet arrangement. The wheels each include a stop thereon which individually cooperates with a corresponding fixed stop forming part of a signaling system. In general, when a substance is to be added, the wheels, which are interlocked after presetting, are released so that rotation thereof produced by the release of a portion of the stored energy in the plummet arrangement will cause the stop on the wheel corresponding to that substance to engage a corresponding fixed stop. At this time the substance is added to the container until balancing of the balance arm takes place which balancing is sensed by a signaling system which causes release of the fixed stop.

Patented Oct. 27, 1970

INVENTOR
OLLE BOSTRÖM

BY Larson and Taylor

ATTORNEYS

WEIGHING DEVICE FOR AUTOMATICALLY WEIGHING A LOAD COMPRISING A PLURALITY OF SUBSTANCES AND METHOD OF FILLING CONTAINERS WITH THE AID OF THE WEIGHING DEVICE

BACKGROUND OF THE INVENTION

1. Field of the Invention

The present invention relates to weighing apparatus and to filling methods and more particularly to weighing apparatus of the balance arm and slidable weight type and to filling methods using such weighing apparatus wherein a number of substances are to be successively added.

2. Description of the Prior Art

Where the correct quantities of a number of substances are to be determined such as where a mixture of the individual substances is to be formed it is often essential that the correct portion of each individual substance be added to the mixture. Determinations of this type are difficult to obtain and, in general, complicated and thus expensive weighing devices have been resorted to.

An example of an arrangement of this type is that found in Swedish Pat. No. 146,514. This patent discloses a weight, slidable along a balance arm, which is continually displaced during the weighing operation by a motor controlled by a signal system connected to the balance arm. A counter coupled to the motor provides an indication of the number of rotations of the motor which may be translated into a value corresponding to the weight of the load. It is difficult to obtain high precision measurements with devices of this type due to, among other things, the inertia of the balance arm, the weight, and the motor. If the correct quantities of a plurality of substances are to be determined with such a weighing device a number of signal generators corresponding to the number of substances must be incorporated into the device. Such a modification of the weighing device greatly complicates the device and adds substantially to the expense thereof.

A further example of a weighing device wherein the correct quantities of a plurality of successively added substances may be determined basically comprises a pan for receiving the load and a measuring system including a scale pointer for indicating the weight of the load. A signal generator responsive to the position of the pointer controls actuation and deactuation of a series of valves controlling the quantities of the various substances to be added. If accurate readings are to be obtained with a system of this type it is necessary to include a complex equalizing means therein which further adds to the complexity and expense of the overall device.

SUMMARY OF THE INVENTION

In accordance with the present invention a relatively simple, rugged and dependable weighing device for providing accurate automatic determinations of the quantities of a plurality of successively supplied substances is provided.

In general, the weighing device of the present invention is of the balance arm and displaceable weight type and includes a series of stops which control the displacement of the weight along the balance arm against a force which tends to return the weight to the initial position thereof. The positions of the stops are preset and this presetting causes movement of the weight such as to increase the amount of weight required to balance the balance arm. Presetting of the movable stops also increases the stored energy in the means for providing the returning force. The number of movable stops is related to the number of substances to be successively added and each of these stops individually cooperates with a fixed stop which forms part of a signaling system controlled by the positioning of the balance arm.

The weighing apparatus of the present invention may be utilized in accurately filling a container with a series of sequentially added substances. In operation, the movable stops are preadjusted relative to one another and then interlocked such that they move together. As stated, at this time the weight is displaced along the balance arm such as to increase the weight of the load necessary to balance the arm and the stored energy in the return system for the weight is simultaneously increased. The positioning of the movable stops are determined by scales located on the movable members carrying these stops, the relative position of each stop corresponding to the predetermined quantity of a substance to be added. After the stops are preset, the first movable stop is permitted to engage the corresponding fixed stop and the load is added to the balance arm. A first substance is added to the load container until balancing of the balance arm takes place whereupon the balance arm responsive signaling system will cause release of the fixed stop. This system will also cause shutting off of the supply of the first substance as well as initiate the supply of the next substance to be added. When the first fixed stop is released the weight will be displaced along the balance arm by the returning force until engagement of the second movable stop with the corresponding fixed stop terminates this displacement. The second substance will be added until the balance arm again balances and this sequence will be repeated until all of the substances are supplied to the load container.

It will be appreciated that because all adjustments of the movable stops and of the displaceable weight are performed before the actual filling and weighing process begins the effect of frictional forces during the weighing process is substantially eliminated and thus the quantities of the various substances may be very accurately determined.

DESCRIPTION OF THE PREFERRED EMBODIMENTS

Figure 1:
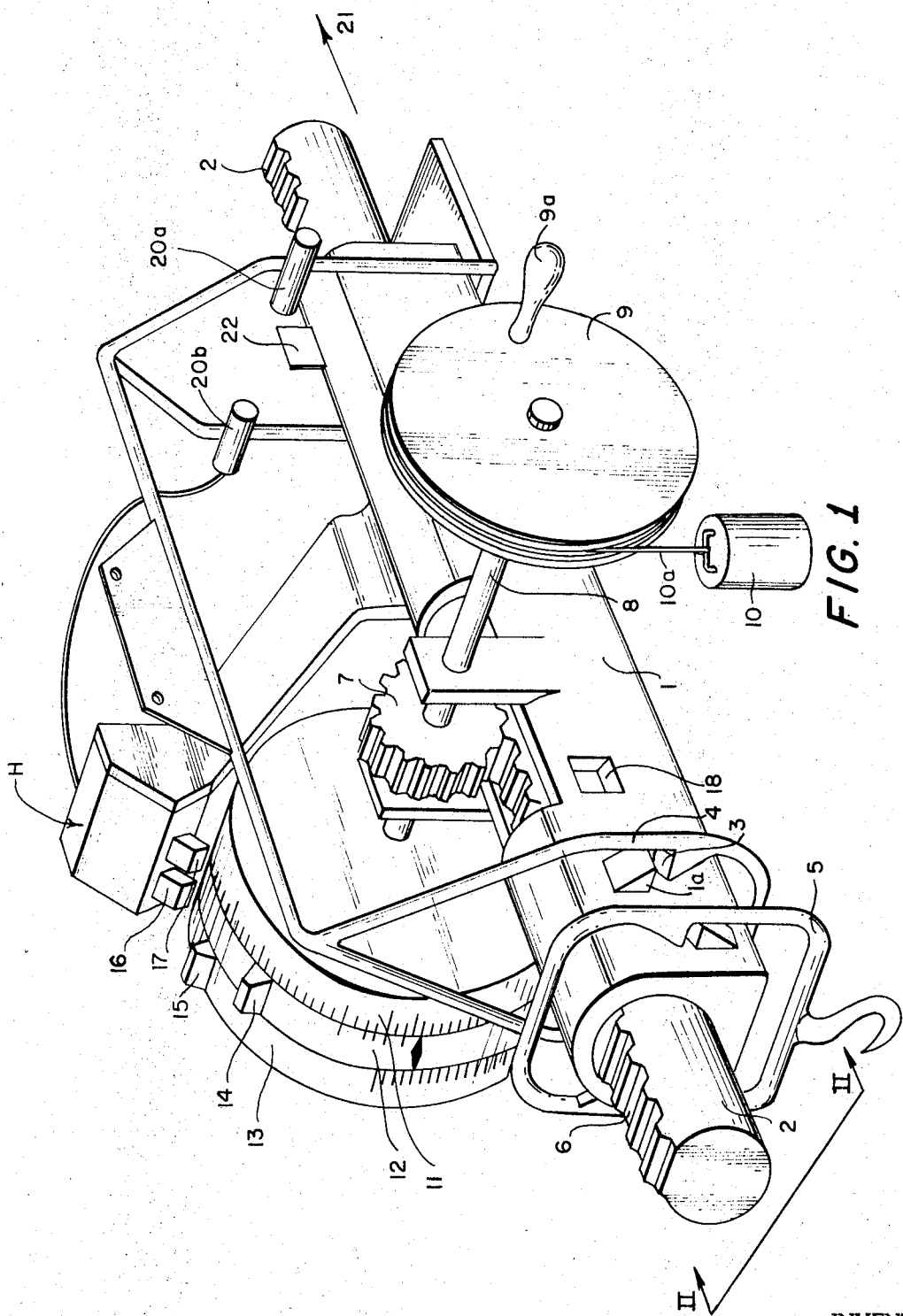
FIG. 1 is a perspective view of a presently preferred embodiment of the invention.

Referring to FIG. 1, an elongated weight 2 is received in a longitudinal bore in a balance arm 1 and is displaceable therein. Balance arm 1 includes a pair of outwardly extending members 1a (one of which is shown) each of which are engaged by a bevel edge 3 of a support frame 4 as shown. Support frame 4 can for example be attached to a wall, suspended from a roof or from a traveling belt arrangement in the roof. A load support member 5 is positioned along balance arm 1 near the end thereof and near the point of support provided by edge 3. Support member 5 is mounted on balance arm 1 in a conventional manner as shown and includes a downwardly extending hook adapted to receive the container (not shown) to which the various substances are to be added. Weight 2 is generally cylindrical in form but includes a rack 6 located on the upper surface thereof which cooperates with a pinion 7. Pinion 7 is attached to a shaft 8 which is affixed at one end to a wheel 9 and at the other end to a further wheel 11.

Wheel 9, which includes a handle 9a thereon for causing rotation thereof, is provided with a circumferential groove 9b in which may be wound a length of line or cord 10a having a plummet 10 attached to one end thereof.

Figure 2:
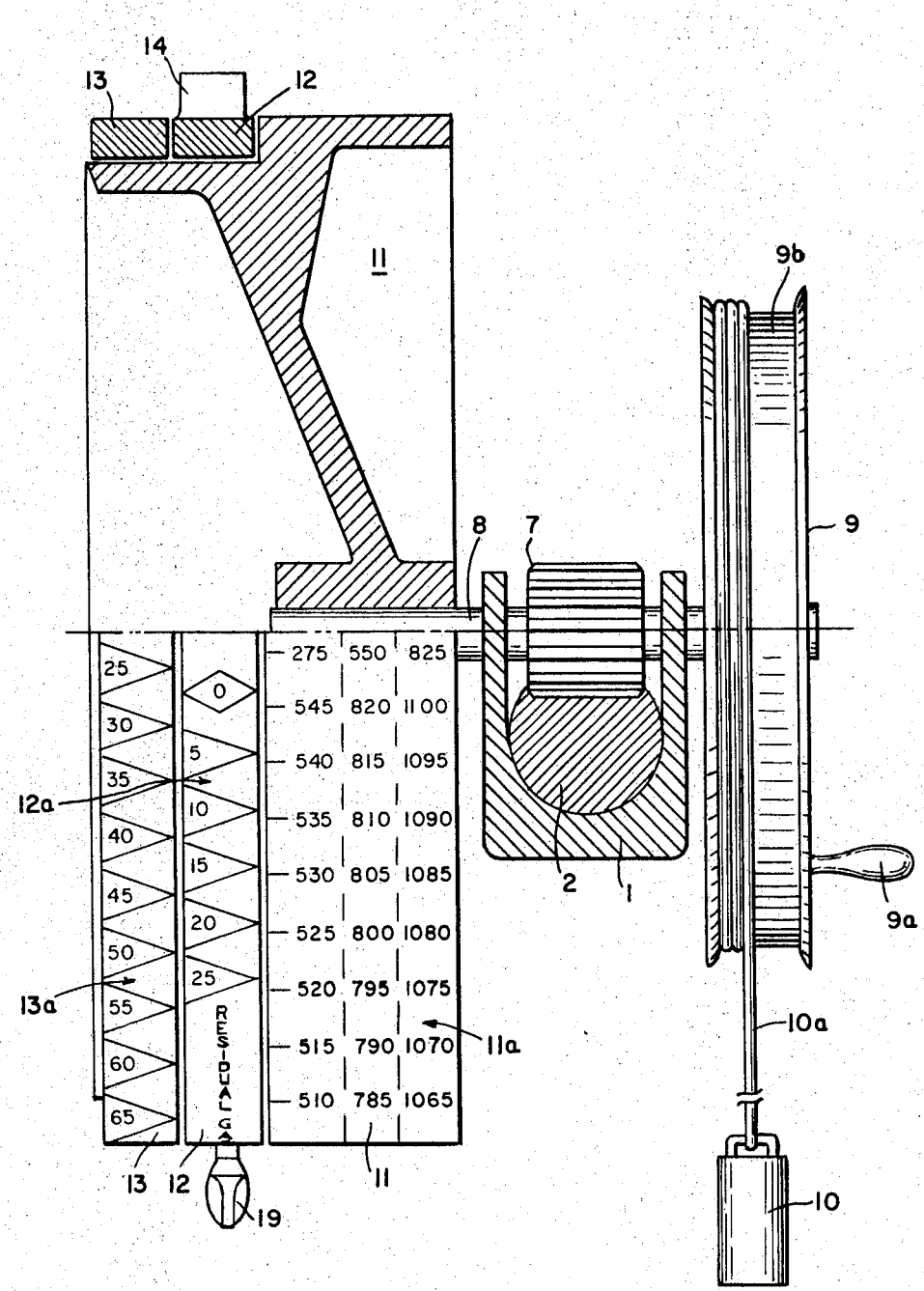
FIG. 2 is an enlarged sectional view of the embodiment of FIG. 1 taken generally in the direction II–II, certain portions being removed for purposes of clarity.

As may best be seen in FIG. 2 a series of wheels 12 and 13 are mounted for rotation about an outwardly extending portion of inner wheel 11. As is best shown in FIG. 2 wheel 11 includes a series of scales 11a which are graduated to provide an indication of the tare weight of the container used as is more fully explained hereinbelow. Because, as shown, wheel 11 includes a series of three scales, a window 18 is provided in balance arm 1 which permits viewing of weight 2. The scale with which one is operating is determined by the number of rotations of wheel 11 and correspondingly by the displacement of weight 2 along balance arm 1. It will be appreciated that the greater the distance along balance arm 1 in the direction indicated by arrow 21 the greater the load necessary to balance arm 1 and thus the greater the scale indication on wheel 11. Thus by providing a series of different colors along the length of weight 2 and correlating these colors to the scale 11a, for example, by painting each scale with a corresponding color, a direct indication of which scale corresponds to the particular position of displacement of the weight 2 is provided.

Wheels 12 and 13, which are also provided with suitable scales 12a and 13a, respectively, include stop members 14 and 15 projecting outwardly therefrom. Stop members 14 and 15 cooperate with fixed stop members 16 and 17 which form part of a signaling system. Stop members 16 and 17 extend outwardly from a housing H and are adapted to be withdrawn into housing H responsive to a signal provided by a signaling system including an upright member 22 mounted on balance arm 1. The signaling system further comprises a light source 20a the output of which is directed toward a photosensitive cell 20b. The balance arm 1 in the balanced position thereof, i.e., horizontal, member 22 will be located out of the path between source 20a and cell 20b and light falling on cell 20b will actuate a suitable mechanism within housing H to cause the stops 16, 17 to be withdrawn therein. The signaling system further includes conventional means (not shown) for controlling valves in the supply systems for the various substances. As is explained hereinbelow shutting off of the supply of a first substance and the initiation of the supply of a second substance is coordinated with the release or withdrawal of the stops in the weighing process.

Although as set forth hereinbelow the embodiment of FIGS. 1 and 2 is subject to modification this embodiment has several advantages. For example, the use of the plural wheel arrangement including wheels 11, 12 and 13 provides magnification of the measuring scale to whatever extent desired without sacrificing accuracy. Displacement of weight 2 through the rack-and-pinion arrangement shown provides positive coupling between the graduated scales on wheels 11 to 13 and the weight 2 itself which further contributes to the overall accuracy of the system. Further, the embodiment shown is of sturdy construction and neither the presetting of the device nor the sensitivity thereof is impaired in transportation. Additionally, it is noted that because only a single signal generator arrangement is required for automatic operation the overall dependability of the device is increased and the construction thereof is simplified.

Understanding of the operation of the device may be best had through consideration of a specific weighing sequence wherein acetylene containers are to be filled. Acetylene containers include a porous mass therein for retaining the substances added and are partially filled with acetone into which the acetylene is dissolved to prevent decomposition of the acetylene. It will, of course, be appreciated that the device of the present invention can be utilized in weighing other substances.

Turning to the actual process, the "empty" containers used in the filling process actually always contain a certain quantity of acetone from previous use as well as a certain amount of residual gas. The residual gas in the containers is measured with the aid of a manometer graduated in weight units. The tare weight of of the container is stamped thereon before use and this weight comprises the weight of the container housing, the weight of the porous mass within the container housing and the weight of the correct quantity of acetone to be added. Before the container is loaded onto the weighing device the wheels 11 to 13 are individually adjusted relative to one another. Manual displacement of weight 2 against the force provided by plummet 10 through pinion 7 will permit the proper weight ranges to be selected, displacement of weight 2 also causing displacement of inner wheel 11. The angular positions of wheels 12 and 13 may be adjusted relative to wheel 11 and to each other and the desired positions thereof may be set by locking these wheels to inner wheel 11 by means of suitable means such as set screw 19 of FIG. 2.

To further facilitate understanding of the operation of the invention a specific numerical example will be considered. It will be assumed that a container having a tare weight of 54.1 kilograms is to be filled with acetylene. The tare weight of the container, as explained hereinabove, consists of the weight of the container housing, the porous mass within the housing and the correct quantity of acetone. The tare scale is located on inner wheel 11 and the value 541 is sought on this wheel. As described hereinabove the color of the portion of the weight 2 viewed through window 18 indicates the particular range on scale 11a in which one is operating. Intermediate wheel 12 includes a scale for residual gas and the weight corresponding to the quantity of residual gas determined from the manometer measurement described hereinabove, for example, 0.5 kilograms is set, through rotation of wheel 12, opposite the 541 scale marking on inner wheel 11. This being accomplished wheels 11 and 12 are interlocked by set screw 19. Next, the scale marking on wheel 13 corresponding to the predetermined value of acetylene to be added is located on scale 13a and set opposite to the appropriate marking on the tare scale 11a. For example, where 3.2 kilograms of acetylene are desired to be added the scale division 32 on scale 13a is placed opposite the 541 division on scale 11a as shown. Wheels 11 to 13 are then interlocked as before. It will be noted that the angular spacing between movable stops 14 and 15 relative to corresponding fixed stops 16 and 17 is different as is indicated in FIG. 1.

Displacement of weight 2, as described hereinbefore, causes plummet 10 to rise and energy is stored in the plummet arrangement which when released provides a force acting on weight 2 in a direction such as to return weight 2 to the initial position thereof. Thus, after the wheels 11 and 13 are adjusted weight 2, when released, will travel in a direction opposite to arrow 21 until stop 14 on wheel 13 engages fixed stop 16.

At this time the weighing device is loaded with the container being hung on the hook on support member 5. Assuming, as is generally the case, the actual quantity of acetone in the container is below the weight of the quantity included in the total tare weight of 541 grams, the balance arm 1 will pivot about pivot edge 3 such that upright member 22 (or balance arm 1 itself depending on the severity of the unbalance) will lie in the path between source 20a and light sensor 20b. Thus even where the actuating mechanism for withdrawing stops 16, 17 is turned on this mechanism will not be activated because there will be no control signal transmitted thereto from sensor 20b. As more acetone is added to the container balance arm 1 will pivot toward the horizontal and as arm 1 balances light from source 20a will be transmitted to sensor 20b and the actuator for stops 16, 17 will be actuated. Thus stops 16, 17 are momentarily withdrawn such that stop 14 on wheel 12 passes beyond the position of fixed stop 17. Simultaneously a control signal may be transmitted to a valve control arrangement to shut off the supply of acetone and to initiate supplying of acetylene. It is noted that the actuator within housing H may be such that fixed stops 16 and 17 are individually controlled, the important function of the actuator being only to ensure that the stop 17 is removed to permit further rotation of the wheels 11 to 13 while ensuring that stop 16 is in place so that it may engage stop 15 located on wheel 13 upon further rotation of the wheel arrangement. As described hereinbefore when stop 16 is withdrawn into housing H plummet 10 will fall causing rotation of pinion 7 and of wheel arrangement 13. Rotation of pinion 7 will cause displacement of weight 2 in a direction opposite to arrow 21 such that the total weight necessary to balance balance arm 1 is reduced. When stop 15 engages fixed stop 16 the balancing process described hereinabove is repeated. Thus acetylene is added to the container until balance arm 1 is horizontal at which time the signaling system will provide shut off of the valve controlling the supply of acetylene. It will be appreciated that if a number of further substances are to be added the embodiment of FIGS. 1 and 2 need only be modified to incorporate further wheels corresponding to wheels 12 and 13 and associated stops corresponding to stops 14, 15 and 16, 17. Where other substances are not to be added as soon as the control valve for the acetylene is shut off the container may be removed and a fresh container provided so that the process can be repeated.

It is noted that where the frame 4 is supported from a travelling belt suspended from the roof it is possible to transport the container from one position to another during the filling process thus facilitating handling of the containers.

As noted, although the embodiment of FIGS. 1 and 2 provides certain advantages various components thereof can be modified within the scope of the invention. For example, rack 6 can be replaced by a number of other forms of driving mechanisms and wheel 9 and plummet 10 can be replaced by a spring mechanism located between the weight 2 and the support frame 4. As set forth hereinabove the number of additional wheels corresponding to wheels 12 and 13 is not limited and a number of additional wheels may readily be provided where additional substances are to be added to the container. Additionally, the stops 14 and 15 located on wheels 12 and 13 can be replaced by a stop or stops fixed on the weight itself which is adapted to cooperate with a plurality of stops provided along the path of the weight.

It will be understood by those skilled in the art that the embodiment of the invention shown and described herein is subject to various other modifications without departing from the scope and spirit of the invention. Accordingly, it should be understood that the invention is not limited by the exemplary embodiments shown and described but rather only by the subjoined claims as construed in light of the spirit of the invention.

I claim:

1. An automatic weighing device for weighing a load including a plurality of sequentially added substances, said device comprising a balance arm, means for supporting said balance arm, a weight displaceable along the length of said balance arm, means for supporting a load at a point near one end of said balance arm, a plurality of preadjusted movable stop means for controlling the displacement of said weight along said balance arm, the number of said movable stop means being related to the number of the substances to be added, at least one fixed stop for engaging one of said plurality of movable stops, means responsive to the positioning of said balance arm relative to the weight of a substance being added for controlling removal of said at least one fixed stop from the path of movement of said movable stop, and means for causing displacement of said weight along said balance arm until one of said plurality of said movable stop means engages said fixed stop means, said balance arm responsive means causing removal of said at least one stop means when said balance arm is balanced.

2. A weighing device as claimed in claim 1 wherein said weight comprises an elongate member slidably received within said balance arm.

3. A weighing device as claimed in claim 1 wherein said weight displacement causing means comprises plummet means.

4. A weighing device as claimed in claim 1 further comprising at least one wheel, a shaft for mounting said wheel, and gearing means mounted on said shaft for causing displacement of said weight upon rotation of said at least one wheel.

5. A weighing device as claimed in claim 4 wherein said at least one wheel comprises a plurality of wheels containing scale graduations thereon and means for interlocking said wheels, said movable stops being individually mounted on said wheels.

6. A weighing device as claimed in claim 1 wherein said balance arm responsive means includes light sensitive means for detecting balance of said balance arm and for providing a signal for causing removal of said fixed stops.

7. A method of filling containers with predetermined quantities of a plurality of substances using a weighing device including a balance arm and a weight displaceable along said balance arm comprising presetting said device by displacing the weight along said balance arm against a force tending to return said weight to the initial position thereof and presetting the positions of a number of movable stops corresponding to the desired quantities of the substances to be added, the number of adjustable stops being related to the number of substances to be added, permitting movement of said weight responsive to said returning force such that one of said movable stops contacts a fixed stop forming part of a signaling system, said fixed stop preventing said weight from returning to the initial position thereof, and filling said container with a first substance until said balance arm is balanced and a signal from said signal system provides release of said fixed stop, said weight then being displaced by said returning force toward the initial position thereof until a second one of said preset stops contacts a corresponding fixed stop.